Dec. 8, 1953  W. M. WINSLOW  2,661,596
FIELD CONTROLLED HYDRAULIC DEVICE
Filed Jan. 28, 1950  2 Sheets-Sheet 1
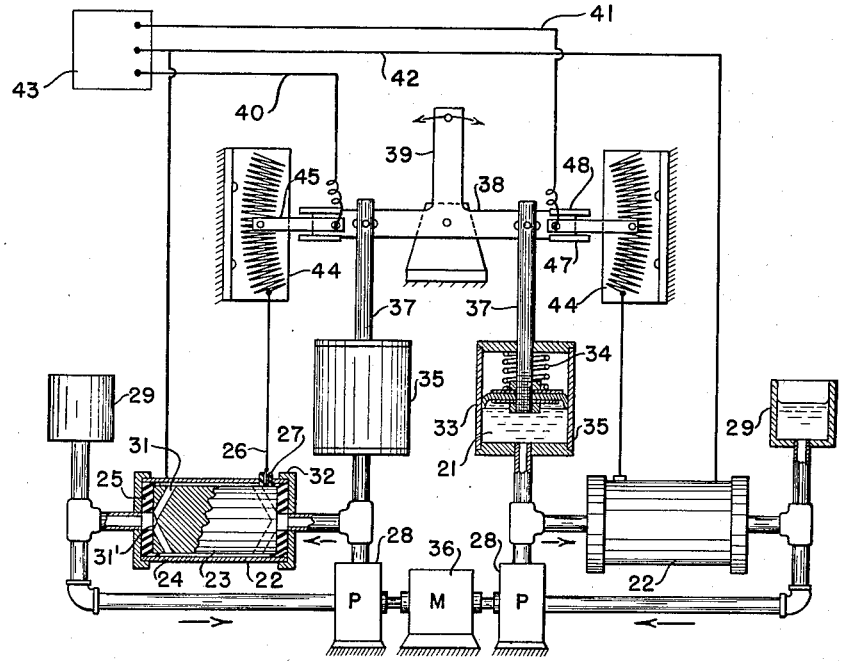
FIG.—1
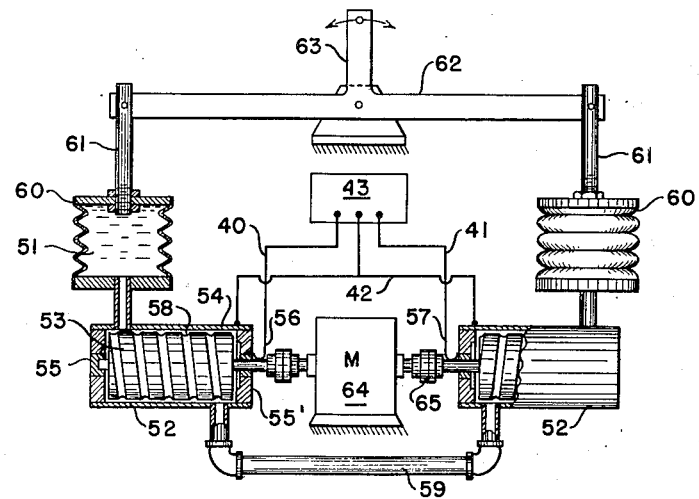
FIG.—2
*INVENTOR.*
Willis M. Winslow
BY
*Lampher and Van Valkenburgh*
ATTORNEYS Dec. 8, 1953  W. M. WINSLOW  2,661,596
FIELD CONTROLLED HYDRAULIC DEVICE
Filed Jan. 28, 1950  2 Sheets-Sheet 2
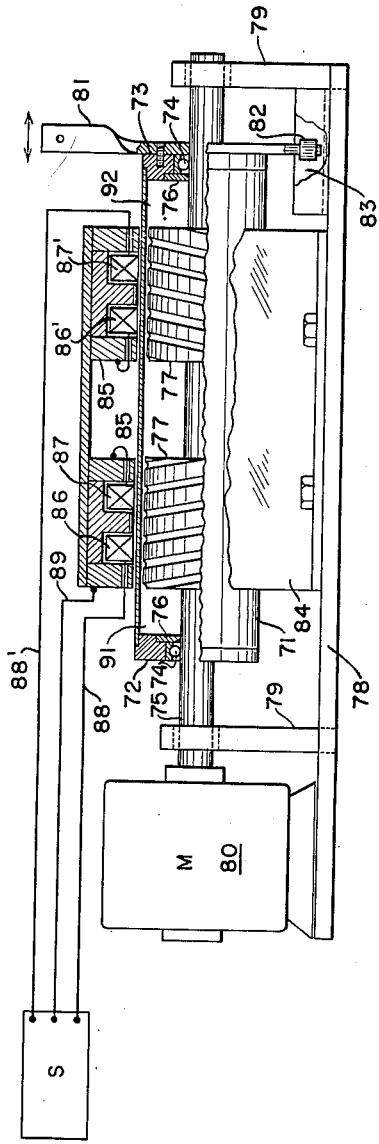
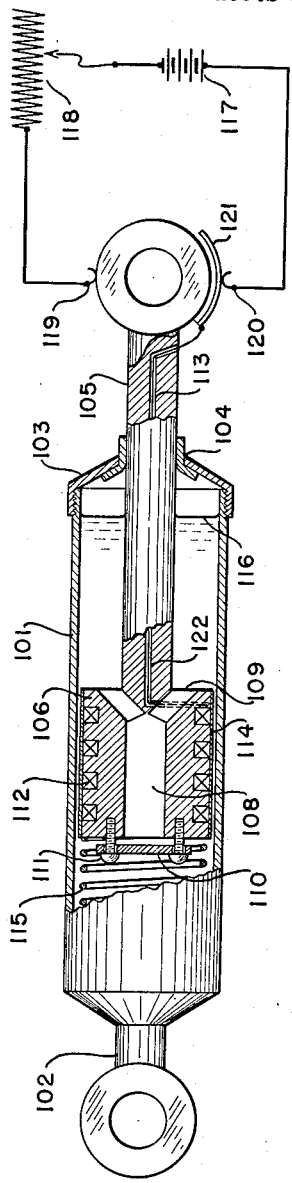
INVENTOR.
Willis M. Winslow
BY
ATTORNEYS Patented Dec. 8, 1953

2,661,596

UNITED STATES PATENT OFFICE 2,661,596

FIELD CONTROLLED HYDRAULIC DEVICE

Willis M. Winslow, Wheatridge, Colo., assignor to Wefco Inc., Denver, Colo., a corporation of Colorado Application January 28, 1950, Serial No. 141,022

19 Claims. (Cl. 60—52)

This invention relates to hydraulic devices for transmitting or releasing forces through the agency of an incompressible fluid and particularly to devices wherein the flow of such fluid or the forces received by or transmitted by the fluid are controlled in magnitude or direction in a new and facile manner.

The invention is based on my discovery that the resistance to flow of certain kinds of fluids, of a nature hereinafter disclosed, can under proper conditions be altered over a very wide range by subjecting the fluids to applied fields of selected magnitude. For example, it has been found that the pressure required to initiate flow of such fluids through a thin parallel-walled passage about 0.01 inch thick can be made to reach values of the order of 50 to 100 p. s. i. per inch length of passage when intense fields are applied normal to the film of fluid.

Fluids suitable for the practice of the present invention may be responsive to electric or magnetic fields or both. In all cases it is found for best results that the fluids should be composed of substantially solid particles in the range of from 0.1 to 5 microns particle size, present in the fluid to a high concentration usually exceeding 20% by volume, the vehicle comprising an oily liquid of less than 80% of the volume of the fluid and having a viscosity range between 2 and 20 centipoises at 25 degrees C. Preferably the vehicle contains metallic soaps or similar surface active and gel forming agents which modify the oil phase and the surfaces of the particles to impart thixotropy to the fluids and thereby prevent gravitational settling or agglomeration of the particles. The particles are thus permanently suspended in the vehicle and constitute an inseparable component of the fluid in either the presence or absence of the applied field.

It is also found desirable to condition the surfaces of the particles by subjecting a very concentrated suspension of the particles ranging from 50% to 60% particle volume, to from 10 to 100 hours circulation through a screw pump, after which the fluid is diluted as desired, this operation serving to stabilize the response of the fluids and to increase their induced resistance to flow when used in the manner hereinafter described.

Microscopic examination of the behaviour of the above fluids shows them to be of such nature that the particles attract each other to form a field-induced fibration extending in the general direction of the field, the fibers tying to the bounding surfaces. Apparently, the strength of these fibers and of their attachment to the walls of a passage varies with the field strength as a parabolic function thereof and produces a corresponding resistance to the flow of the fluid in a direction generally transverse of the applied field. Regardless, however, of what may be the precise explanation of the observed flow impedance, it has been found that no bulk separation of the particles from the liquid vehicle takes place. The effect manifests itself as an instantaneous and reversible change in the bulk viscosity of the fluids. Since the particles remain in permanent suspension with the liquid, the effect of the field is an instantaneous and reversible congelation of all of the fluid in the path of the field. In strong fields the fluid apparently "freezes" to a solid condition wherein the liquid is occluded with the particles.

As disclosed herein, I have employed the above findings in a manner whereby controlled volume of flow, shearing stresses, or pressures, of such fluids are used to accomplish useful control operations.

An object of the present invention is the provision of a force control means of highly simplified construction, yet smoothly regulatable over a wide range.

Another object is the provision of hydraulic valving means of simple and reliable construction and having a wide flow-impeding range.

A further object is the provision of a pair of simplified hydraulic force control devices so arranged as to compensate for changes in viscosity due to ambient temperature changes.

A still further object is the provision of improved means to control the force between relatively slidable parts.

Another object is the provision of improved means to control the force between relatively rotatable parts.

An additional object is the provision of improved means to control the force between a slidable part and a rotatable part.

Another object is the provision of an improved method of flow control which dispenses with customary valves.

Still another object is the provision of an improved cam action which eliminates surface contact of the force transmitting members.

Other objects and purposes of the invention will become apparent from its principles and from the following description which is to be read with reference to the accompanying drawings.

In the drawings:

Figure 1 illustrates diagrammatically a hydraulic control device employing a fixed field responsive valving means to control the pumped flow of fluid and the forces exerted thereby;

Figure 2 illustrates a simplification of Figure 1 in which the valving means and pumping means are combined as single units;

Figure 3 illustrates a further simplification combining as a single unit the valving means, pumping means, and force receiving means; and Figure 4 illustrates in partial vertical section a shock absorbing strut incorporating a control feature of this invention.

Referring to Figure 1, a hydraulic control system is shown wherein all fluid passages and chambers are filled with a field responsive fluid, in this instance an electric field responsive fluid, indicated by reference numeral 21. Each side of the system employs a "valve" 22, comprising inner and outer cylindrical electrodes 23 and 24 held in concentric fixed relation to form a thin annular passage by means of recessed insulating end washers 25.

A conductor 26 connects to the inner cylindrical electrode 23 through an insulating seal 27 in the outer electrode of each valve.

The fluid 21 is circulated by pumps 28 through the various pipes as shown, that is, from reservoirs 29 through the annular spaces between electrodes 23, 24 and thence back to the reservoirs. Each inner electrode is provided near its ends with an annular series of passages 31 diverging from axial passages 31' through which the fluid enters and leaves the annular space in each valve. Cap members 32 hold the insulating washers 25 in position against the ends of inner electrode 23 and are provided with inlet and outlet ports for each valve to which the pipes are connected.

Each valve device 22 is arranged, as shown, to by-pass the fluid from the outlet to the inlet of its associated pump 28. When a pair of electrodes 23, 24 is potentialized, the resistance to flow therebetween is increased an amount proportional to the square of the applied voltage. In consequence, a pressure is developed at the discharge side of the corresponding pump 28. The pressure from each pump is utilized to force a piston 33 against a spring 34 in a hydraulic cylinder 35 on each side of the system and to develop additional force for control purposes. It will be clear that the force exerted by each piston is controlled in response to such voltages as may be applied to the valve associated therewith.

Preferably the pumps 28 of the system of Figure 1 are driven by a common means, indicated as a motor 36, but which may be the drive shaft of a guided missile, boat, or the like. If desired, the reservoirs 29 may be combined in a single sealed reservoir.

The forces on the pistons 33 are delivered to rods 37 which are pivotally connected for straight line movement to opposite sides of a pivoted member 38 having a crank portion 39 for delivery of the resultant force to a guiding element such as an aileron, rudder, or the like.

The two control voltages are applied to the valves 22 by supply line 40, 41 and a common line 42, leading from a source 43 which latter may, if desired, fix the magnitudes of these voltages in accordance with radio signals. The supply lines may include series connected rheostats 44 having arms 45 pivoted on opposite ends of the member 38 in such manner that the current through a valve, and therefore the voltage applied, is reduced as the piston responding to that valve is forced outward. In this manner, by selection of resistance values for the rheostats 44, the force exerted by the crank 39 can be modified in accordance with its position.

The system can be made insensitive to slight variations in the magnitude of the applied voltages by provision of lost motion between member 38 and the rheostat arms 45. This is accomplished by the spaced stop members 47, 48 on the ends of member 38 and which must engage the arms 45 before the latter can be moved.

Successful performance of the system of Figure 1 depends on proper operation of the valves 22. Unlike ordinary valves, those illustrated have the property of instantly controlling the flow by reason of the field-induced fibration of the particles of the fluid which produces a bulk congelation of the fluid without segregation of the particles from the oil or the oil from the particles. I have found that the spacing of the electrodes may range from about 0.01 to about 0.06 inch and applied voltages may range from maximum values of 500 to 3000 for these spacings, and that the valves operate satisfactorily for all values of voltages below these maxima.

The length of the valves is chosen in accordance with the force to be delivered to the pistons. The diameter of the valves is chosen sufficiently large that impedance to flow is inappreciable when the valves are de-potentialized. These factors depend of course on the capacities of the pumps used. Pressures of the order of 100 p. s. i. have been satisfactorily controlled using valves 1 inch in diameter and 3 inches in length. Both alternating and direct voltages may be used.

Figure 2 shows a simplification of the system of Figure 1 in which the valving and pumping action are accomplished in a single unit. Each side of the system of Figure 2 is filled with a field responsive fluid indicated at 51, same being an electric field responsive fluid in the example shown. Each side of the system includes a viscosity pump unit 52 comprising inner and outer cylindrical electrodes 53 and 54. The inner electrodes have suitable shafts supported for rotation by insulating bearing members 55 and 55' which also serve to close and seal the ends of the pump units. Suitable brushes, indicated diagrammatically at 56 and 57, make contact with the inner electrodes through their respective shafts.

The fluid is caused to be circulated by the provision of helical grooves 58 in each inner electrode arranged in such manner as to tend to withdraw fluid from the connecting pipe 59 which latter has the function of the reservoirs 29 of Figure 1.

When a pair of electrodes 53, 54 is potentialized, a pressure is developed at the outlet end thereof which is proportional to the square of the applied voltage. Pressures from the two pumps develop in the Sylphon bellows 60 through the connections shown, which tend to expand these bellows and, through the rods 61, to apply forces to opposite sides of the pivoted member 62, the latter having a crank 63 for the same purposes as the crank 39 of Figure 1.

Any suitable driving means such as the common motor 64 may be connected through insulating couplings 65 to drive the inner electrodes. When viewed from the left of Figure 2 the motor is selected for clockwise rotation to produce the described circulation of fluid. In a manner similar to that in Figure 1, supply lines 40, 41 and a common line 42 are connected to apply voltages of regulated magnitude from a source 43 to the respective viscosity pumps. The follow-up rheostats of Figure 1 may also be used in Figure 2 if desired.

In the operation of Figure 2, the electric fields cause fibration of the particles in the fluid and thereby cause flow impedance in the thin annular spaces between the electrodes. At the same time the advancing edges of the grooves force the fluid forwardly into the Sylphons. Pressures build up in the Sylphons, depending of course on the voltages applied. Equilibrium pressures are reached wherein the forward flow produced by the advancing edges of the grooves is balanced by a reverse flow within the grooves. As stated, the pressures produced are proportional to the square of the respective applied voltages. The force exerted by the crank 63 will be proportional to the difference in the pressures delivered by the two pumps as determined by the two control voltages supplied by the source 43.

Satisfactory spacings for the electrodes of the viscosity pumps range from 0.02 to 0.06 inch and satisfactory depth of the grooves from two to ten times the spacing used. Under dynamic conditions the maximum voltages applied to the pumps of Figure 2 may be somewhat higher than for the valves of Figure 1.

Figure 3 illustrates a further simplification of Figure 1 in which the valving means, pumping means, and force receiving means are combined in a single unit. In this form a cylindrical tube 71 has end closure members 72 and 73 carrying ball races 74 in rotatable and slidable relation on shaft 75. Suitable sealing washers 76 are attached to the closure members and bear against the shaft. Carried rigidly on the shaft 75 are two spaced apart grooved rotors 77 having the small wall spacing and depth of groove as the rotors of Figure 2.

A base 78 having fixed upright members 79, each with ball races, serves to support the shaft 75 in coupled relation to a motor 80 which is also supported by the base.

Affixed to the closure member 73 is an operator arm 81, the upper end of which is adapted to apply force to the load. The lower end of arm 81 carries a roller 82 guided by a slot in member 83 which latter is fixed to the base 78. The width of the slot is but slightly greater than the diameter of the roller.

The base 78 also supports a housing 84 within which are fixed a pair of annular field cores 85, each having a pair of axially spaced oppositely wound field coils 86, 87 and 87', 86'.

The field cores 85 and the grooved rotors 77 are made of magnetic steel. The tube 71, however, is made of non-magnetic material, for example non-magnetic stainless steel. The arrangement is such that when the coils are energized a magnetic field passes around each coil and includes in its path an annular portion of the adjacent rotor. Thus, in the example shown, six radial field paths extend across the space between the rotors 77 and the tube 71.

All spaces within the tube 71 are filled with a suitable magnetic field responsive fluid.

The coils are energized by a source S which supplies them with currents of controlled magnitude through wires 88, 88' and a common ground wire 89.

In the operation of the device of Figure 3, the motor 80 rotates the rotors 77 in a clockwise direction as viewed from the left end of the device. Shearing forces are imparted to the fluid by the advancing edges of the grooves, these forces being greatly enhanced when the coils are energized to cause a field induced fibration of the particles and bulk congelation of the fluid in the annular passages between rotors 77 and tube 71. These shearing forces are imparted in part to the walls of the tube 71, longitudinal components being oppositely directed toward the ends of the tube. The circumferential components of the shearing forces are in the same direction and are opposed by the guided roller 82.

The longitudinal components of the shearing forces from each rotor cause pressure to build up in the end chambers 91, 92. These pressures produce additional oppositely directed longitudinal forces on the tube 71 by exertion on the closure members 72, 73.

The longitudinal force produced by each rotor is a parabolic function of the corresponding field, the strength of the latter being proportional to the magnetizing current of the corresponding field coil. Hence the force received by the operator 81 is the difference in the longitudinal components as determined by the difference in the two control currents supplied by the source S. It will be clear, however, that more than two rotors and corresponding field coils can be associated with the tube 71 to impart a resultant force dependent on the algebraic sum of the energizing currents.

While the form shown in Figure 3 has been described as operating with a magnetic field responsive fluid, it is apparent that by insulating the tube 71 and rotors 77 the device may be operated with an electric field responsive fluid in the manner of Figure 2, or a fluid having both magnetic and electric field response may be used with superimposed magnetic and electric control fields. Likewise, it is apparent that the forms of the device of Figure 1 and Figure 2 may be operated with magnetic field responsive fluids by providing these forms with the magnetic field imposing means of Figure 3. Operation in each case depends on my discovery that flow impedance is produced when the fluid is subjected to a field.

Figure 4 illustrates a form of the invention as applied to a remotely controllable shock absorbing strut. In this form a tube 101 of magnetic steel has a sealed lower end to which is welded a tie rod 102. The upper end of the tube is closed by a cap 103 having a sleeve 104 through which passes a second tie rod 105. The lower end of the latter is integral with a piston 106 of magnetic steel having an axial passage 108 communicable with a plurality of converging inlet passages 109. A valve plate 110 is loosely suspended from the bottom of piston 106, as by screws 111 or the like, and provides a check valve for the passage 108.

The piston has a plurality of annular grooves in its periphery in which are wound in alternately opposite directions a plurality of magnetizing coils 112. The coils are serially connected and the lowermost coil has a terminal (not shown) grounded to the piston. The terminal of the uppermost coil is connected to an insulated wire 122 through a suitable bore 113 in the rod 105.

The periphery of piston 106 may be provided with a jacket of thin stainless steel or other non-magnetic material, indicated at 114 and which may be brazed at its ends in sealing relation to the piston.

A compression spring 115 extends between the bottom of the tube 101 and the bottom of the piston to bias the latter upwardly.

All spaces within the tube 101 are filled with a magnetic field responsive fluid to a suitable level indicated by numeral 116.

Current is supplied the coils from a battery 117, through a control rheostat 118, and brushes 119 and 120. The brush 119 makes electrical contact with the rod 105. The brush 120 contacts with an insulated metal strap connected with wire 122.

Satisfactory spacing between the piston and the inner wall of the tube may range from about 0.01 to 0.06 inch. As the space chosen varies, the permissible flow impedance of the non-magnetized fluid will change accordingly.

In the operation of the device Figure 4, the magnitude of compression forces transmitted between rod 102 and rod 105 will depend on their rate of application. Downward movement of the piston 106 is governed by the resistance to upward flow of fluid in the annular passage between piston 106 and tube 101, valve plate 110 having closed the passage 108. This flow resistance is governed by rheostat 118 which controls the magnetizing current and the degree of field induced fibration and bulk congelation of the fluid in the annular passage. Rheostat 118 may of course be controlled in any desired manner to anticipate the required flow resistance.

When compression forces are dissipated, plate 110 opens the passage 108 to reduce the flow impedance and piston 106 is moved upwardly to starting position by the spring 114.

The device of Figure 4 can be adapted for operation with an electric fluid by providing suitable insulation of the cylinder from the tube, as will be readily understood.

It will be understood that the foregoing devices may be varied in the constructional details thereof without departing from the invention as defined in the subjoined claims. For example, the parts of the valve of Figure 1 need not be cylindrical but may be various shapes to provide suitable passages between concentric bodies of revolution or between flat plates. Also, it will be understood that the device of Figure 3 may be modified by an inversion in which the tube is rotated and the inner members mounted for longitudinal movement. It is my intention to include within the scope of the subjoined claims all such modifications of my invention as will come within their terms and scope.

Fluids suitable for the foregoing devices may be made from a variety of materials. The following formulas and procedures should be considered exemplary rather than limitative of fluids contemplated by the present invention.

For the electric field responsive fluids, I may add 100 parts by weight of dry micronized silica gel powder of desiccant grade to a solution containing about 40 parts by weight of an electrically stable dielectric oily vehicle of from 2 to 20 centipoises viscosity at 25 degrees C., about 15 parts by weight of an oil soluble dispersing agent such as sorbitol sesquioleate sold as Arlacel C, ferrous oleate, lead naphthenate, etc., about 10 parts by weight of a water soluble dispersing agent such as sodium oleate, sodium naphthenate, polyoxalkylene derivative of sorbitol oleate sold as Tween 80, etc., and about 15 parts by weight of water.

For the vehicle I may use purified petroleum fractions available as so-called white oils and transformer oils or I may use various di-esters such as dibutyl sebacate, di-2-ethylhexyl adipate sold as Adipol 2EH, or mixtures of such petroleum fractions and di-esters.

In lieu of the above mentioned water soluble ingredients which become absorbed by the silica gel particles, I may substitute part for part of borax (anhydrous basis) up to the full 10 parts, or I may substitute up to 10 parts (dry basis) of various gelatinous metallic hydrates, of FeO, $Fe_2O_3$, SnO and the like, or mixtures of such hydrates, and up to about 6 parts of the water may be replaced by glycerine, di-ethylene glycol and the like.

This mix, which is initially in a somewhat pasty condition, is circulated through a pump such as shown and described in my prior application, Serial No. 716,626, filed December 16, 1946, now abandoned. The pumping is continued until the mix becomes a readily flowing thixotropic syrup. During the latter part of the pumping the fluid is exposed to drying conditions to remove about half of the original 15 parts of water and to bring the resistivity of the fluid into the range between $10^8$ and $10^{10}$ ohm cm. The mix may then be diluted as desired by additions of the vehicle to provide a fluid of which the suspended particles are a permanent component.

For magnetic field responsive fluids I may add 100 parts by weight of iron powder, particle size preferably under 5 microns, made by retorting iron carbonyl in a manner well known in the art, to a solution containing 10 parts by weight of an oily dielectric vehicle such as described above, and 2 parts by weight of ferrous oleate or ferrous naphthenate as dispersant. The somewhat pasty mix is pumped as before until fluidized. Toward the end of the pumping operation I prefer to add about 1 part by weight of an alkaline soap such as lithium stearate or sodium stearate to impart thixotropic body to the fluid. The mix may then be diluted as desired by additions of vehicle to provide a fluid of which the suspended particles are a permanent component.

For fluids responsive to both electric and magnetic fields, I may use micronized powders of so-called ferrites, these being mixed oxides of various metals which may be prepared as described in Patents No. 2,452,529 and 2,452,531. These particles are permanently incorporated in the above described vehicle with the aid of the above dispersants and thixotropic agents in the same manner as the silica gel and iron powders.

In general, the thixotropic body of these field responsive fluids may be increased by substituting for part of the oleates or naphthenates a corresponding part of laurate, palmitate, or stearate.

The purpose of the prolonged pumping operation in the above procedures is two-fold: Agglomerates of the primary particles are broken up so that the largest particles present are near micron size; and the surfaces of the primary particles are conditions or smoothed in a manner not fully understood. In this way the normal viscosity of the fluid is reduced and the field-induced viscosity in increased.

The function of the soaps or soap-like additives in the above formulas is three-fold: (1) they enable very concentrated yet workable fluids such that on working in a pump the agglomerates are broken up by large shearing forces; (2) they provide a particle coating with low sliding coefficient of friction; (3) they serve to render the fluid thixotropic to prevent settling of the particles. Other functions of the soaps or dispersing agents involve the electric double layer which determines whether the particles will have repulsion or attraction apart from the action of the applied field, and in the case of electric field responsive fluid the dielectirc strength of the film on the particle is also involved.

This application is a continuation in part of my co-pending applications Serial No. 716,626, filed December 16, 1946, and now abandoned, and Serial No. 69,646, filed January 7, 1949.

I claim:

1. In a control device, means forming a passage, a fluid in said passage comprised of liquid and permanently suspended particles responding to the presence of a field across said passage to impart resistance to the flow of said fluid therein, means applying mechanical force tending to propel said fluid through said passage, means operatively associated with said passage to receive force from said fluid, and means applying a field across said passage to control the flow resistance of said fluid therethrough and thereby the force received by said last named means.

2. The device of claim 1 in which said force receiving means includes an expansible chamber.

3. The device of claim 1 in which said force applying means includes a rotary pump.

4. In a control device, means forming a pair of passages, a fluid in said passages comprised of liquid and permanently suspended particles responding to the presence of fields across said passages to impart resistance to the flow of said fluid therein, means applying mechanical force tending to propel said fluid through said passages, means operatively associated with each said passage to receive forces from the fluid, and means applying fields across each said passage to control the flow resistance of said fluid therethrough and thereby the forces received by said force receiving means.

5. The device of claim 4 wherein said force receiving means are interconnected to receive the forces in opposition.

6. The device of claim 4 wherein said applying means includes a rotary pump for each passage.

7. The device of claim 4 wherein said force receiving means includes expansible chambers respectively communicating with said passages.

8. In a control device, a pair of cylindrical members, means supporting said members in concentric spaced relation to form an annular passage, a fluid in said passage, said fluid being of the type comprised of liquid and permanently suspended particles responding in the presence of a field across said passage to impart resistance to the flow of fluid in said passage, means operatively associated with one end of said passage to receive forces from said fluid, and means applying a field across said passage to control the flow resistance of the fluid therethrough and thereby the force received by said last named means.

9. The device of claim 8 in which said supporting means holds said cylindrical members in stationary relation to each other.

10. The device of claim 8 in which said supporting means supports said cylindrical members for relative rotation to each other.

11. A device for applying controlled mechanical forces to an operating element comprising: a pair of inner members, means encasing said members and forming therewith a pair of thin chambers, a fluid in each said chamber in contact with walls of each said inner member and said encasing means, said fluid being comprised of a liquid and permanently suspended particles attractable in the presence of a field to impart shear resistance to said fluid, driving means connected to impart shear forces through said fluid, means to apply a controlled field across the fluid in each chamber, and means receiving forces from said fluid in each chamber and arranged to apply the difference of said forces to said operating element.

12. The device of claim 11 wherein means are provided for rotatably supporting said inner members and wherein said driving means is connected to rotate said inner members.

13. The device of claim 12 wherein said inner members and encasing means are cylindrical and concentric.

14. The device of claim 13 wherein said encasing means is a single cylindrical wall of uniform diameter.

15. The device of claim 14 wherein helical grooves are formed on said inner members.

16. In combination, a tube, a shaft extending axially of the tube, a cylindrical member mounted on said shaft and of slightly smaller diameter than the inner diameter of said tube, a fluid occupying the space between the tube and cylindrical member and comprised of a liquid with permanently suspended particles therein attractable in the presence of an applied field to impart shear resistance to said fluid, means supporting said cylindrical member and tube for relative axial movement, and means to apply a field transversely across the space between the cylindrical member and said tube.

17. The combination of claim 16 wherein said cylindrical member is provided with a helical groove and means are provided to rotate said shaft.

18. The combination of claim 17 wherein means are provided to guide the axial movement of said tube.

19. The combination of claim 16 wherein said supporting means includes an end closure for said tube having a slidable sealing bearing surrounding said shaft.

WILLIS M. WINSLOW.

References Cited in the file of this patent

UNITED STATES PATENTS

| Number | Name | Date |
| --- | --- | --- |
| 1,687,286 | Freer | Oct. 9, 1928 |
| 1,890,041 | McLeod | Dec. 6, 1932 |
| 1,952,806 | Hyland | Mar. 27, 1934 |
| 2,398,421 | Frische et al. | Apr. 16, 1946 |
| 2,417,850 | Winslow | Mar. 25, 1947 |
| 2,505,049 | Keller | Apr. 25, 1950 |

FOREIGN PATENTS

| Number | Country | Date |
| --- | --- | --- |
| 17,936 | Great Britain | Aug. 26, 1908 |
| 239,475 | Great Britain | Dec. 11, 1924 |
| 485,592 | Belgium | Nov. 13, 1948 |

OTHER REFERENCES

"Magnetized Iron-Oil Mixes" article in "Business Week," December 18, 1948, pages 48–50.

"New Uses for Mag Fluids" article in "Bureau of Standards Bulletin," June 19, 1949, pages 74–75.